UNITED STATES PATENT OFFICE.

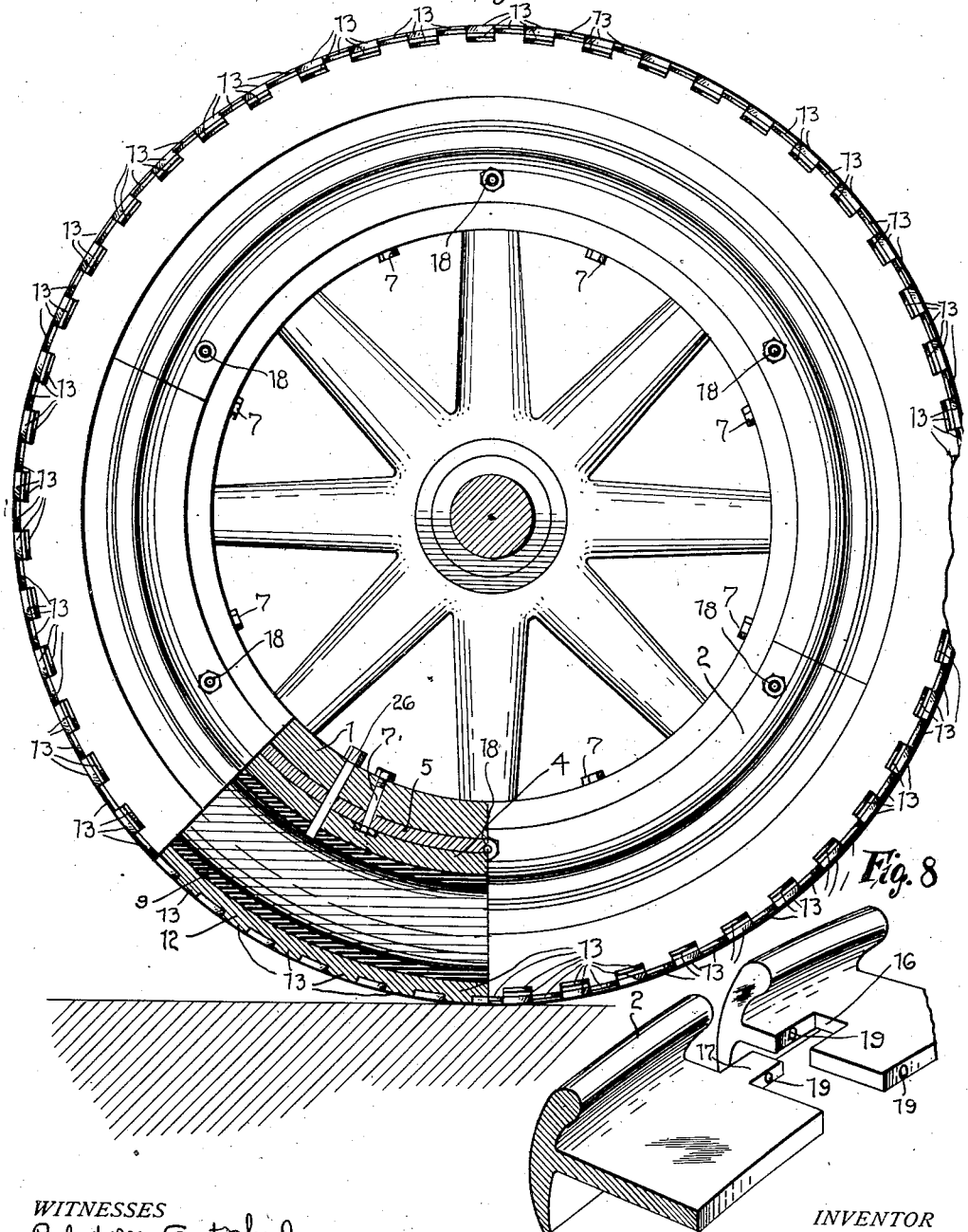

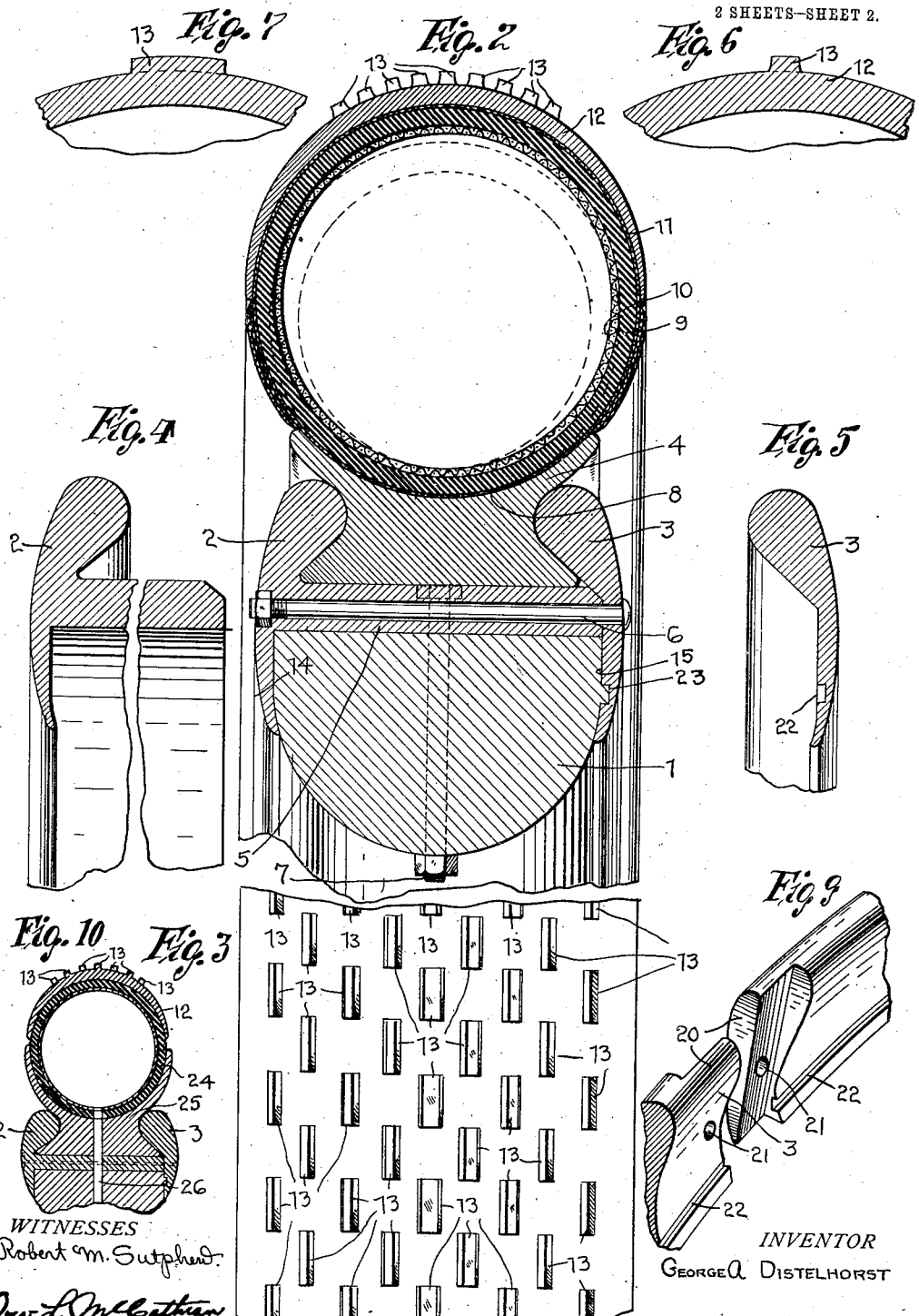

GEORGE A. DISTELHORST, OF LESHARA, NEBRASKA, ASSIGNOR OF ONE-THIRD TO JOHN A. SWANSON, OF OMAHA, NEBRASKA.

WHEEL-RIM.

1,050,624.   Specification of Letters Patent.   Patented Jan. 14, 1913.

Application filed November 13, 1911. Serial No. 660,016.

*To all whom it may concern:*

Be it known that I, GEORGE A. DISTELHORST, a citizen of the United States, residing at Leshara, in the county of Saunders and State of Nebraska, have invented certain new and useful Improvements in Wheel-Rims, of which the following is a specification, reference being had therein to the accompanying drawing.

This invention relates to automobile wheels and its object is, primarily to provide an improved rim for such wheels.

Another object of this invention is to provide means by which the tire may be readily attached to the rim or detached from it.

With these and other objects in view this invention consists of certain novel constructions, combinations, and arrangements of parts as will be hereinafter fully described and claimed.

In the drawings:—Figure 1 is a side elevation of the wheel. Fig. 2 is a transverse section through the tire felly and rim. Fig. 3 is a fragmentary plan view thereof. Fig. 4 is a fragmentary sectional view through the clamping means for the tire. Fig. 5 is a transverse sectional view through one of the sections of the clamping means of the tire. Fig. 6 is a transverse section through the tire protector. Fig. 7 is a longitudinal section thereof. Fig. 8 is a perspective partly in section of the clamping means for the tire showing the manner of assembling the segments of the primary section. Fig. 9 is a perspective partly in section of the auxiliary section of the clamping means for the tire showing the means for assembling the segments thereof. Fig. 10 is a transverse sectional view of an embodiment of the invention illustrated in Fig. 2.

Referring to the drawings by numerals 1 designates the felly of a wheel to which is secured the tire securing clamp, which tire securing clamp comprises a primary section 2, and an auxiliary section 3. Each of the primary and auxiliary sections is provided with enlarged portions for gripping the tire supporting member 4. The primary section of the clamping means is provided with an annular flange 5 which flange extends the entire width of the rim 1, and forms a rest for the tire supporting member 4. The two sections 2 and 3 constituting the arm are held firmly together by means of transversely extending bolts 6. The tire supporting member 4 is firmly held upon the rim and flange portion 5 of the clamping member by means of bolts 7.

The outer surface of the tire supporting member 4 is concave as at 8, and carries a tire 9 having an inner lining fabric or protecting material 10. An outer protecting strip of fabric, preferably of canvas 11 is carried by the outer face of the tire 9, and upon this outer strip is placed the metallic protector 12. This metallic protector conforms to the shape of the tire when inflated, and is of a slightly smaller curvature than the tire when in an inflated condition. It will therefore be obvious that the protector is first placed upon the tire when not inflated, and as the tire becomes inflated, the tire protector 12 will be firmly clamped upon the tire 9. A plurality of lugs 13 are formed upon the outer edge of the protector 12 and are especially useful in slippery weather when it is desired to obtain a good grip by the wheel. These lugs 13 extend longitudinally of the protector 12 and are preferably of an oblong structure, being placed in zigzag rows so as to form an efficient gripping surface.

The primary and auxiliary sections of the rim or tire securing member are provided with inwardly extending flanges 14 which flanges are dished upon their inner surface as at 15 to conform to the shape of the wheel. In this way an efficient clamping member has been produced, since, owing to the curve of the securing sections, considerable resistance will be offered to any outward movement of the sections upon the felly.

The primary section of the tire clamping means comprises a plurality of segments, one of said segments being provided with a notch 16 formed in one end into which is adapted to fit the tongue 17 of the other segment. Bolts 18 pass through the apertures 19 formed in the respective segments for holding the same together. The auxiliary section of the tire clamping means also comprises a plurality of segments having overlapping ends 20. Each of the overlapping ends 20 is provided with apertures 21 which register with apertures 19 in the primary section for receiving the bolt 18 whereby the primary and auxiliary sections will be held together. The auxiliary section is provided with a longitudinally extending groove 22 upon its inner face for receiving the rib 23 formed upon the felly of the wheel. This rib holds the auxiliary section of the tire clamping member in its correct position while the bolts 18 are being placed in position.

In Fig. 10 I have illustrated an embodiment of my invention wherein the tire 24 is provided with an integral lower base 25 shaped so as to conform to the contour of the inner gripping portions of the clamping sections 2 and 3 of the tire clamping means. An inflating valve 26 passes through the felly 1 of the wheel and through one of the sections of the clamping means and enters the tire as is illustrated in Fig. 10.

What I claim is:—

In a wheel, a felly, a tire supporter positioned about said felly, a rim removably connecting said supporter with said felly, said rim comprising a major and an auxiliary section, a flange extending from said major to said auxiliary section and between said felly and tire supporter, said rim being formed from a plurality of arcuate sections, the end of one of said sections having its flange provided with an inwardly extending notch, and the adjoining section having its end provided with a tongue extending into said notch, and securing means passing through said rim to hold said major and auxiliary sections together and said tongue in said notch.

In testimony whereof I hereunto affix my signature in presence of two witnesses.

GEORGE A. DISTELHORST.

Witnesses:
F. S. FENERSTEIN,
OLE NELSON.